(12) United States Patent
Graff et al.

(10) Patent No.: US 6,336,254 B1
(45) Date of Patent: Jan. 8, 2002

(54) CURVED HANDLE ADAPTED FOR ATTACHMENT TO A WHEELBARROW OR THE LIKE, AND A METHOD OF MANUFACTURING THE SAME

(75) Inventors: Warren D. Graff, Monongahela; Steve A. Cirucci, Monroeville; William W. McCormick, Smithton, all of PA (US)

(73) Assignee: The Idea Guys, Inc., Monongahela, PA (US)

( * ) Notice: Subject to any disclaimer, the term of this patent is extended or adjusted under 35 U.S.C. 154(b) by 0 days.

(21) Appl. No.: 09/222,965

(22) Filed: Dec. 30, 1998

(51) Int. Cl.⁷ ................................................. B62B 5/06
(52) U.S. Cl. ........................... 16/422; 16/427; 16/436; 72/367.1
(58) Field of Search ......................... 16/422, 427, 444, 16/436; 280/47.31, 47.3

(56) References Cited

U.S. PATENT DOCUMENTS

| | | | |
|---|---|---|---|
| 103,430 A | * | 5/1870 | Cronkite |
| 501,314 A | * | 7/1893 | Arnold |
| 1,096,630 A | * | 5/1914 | Koehler |
| 1,485,179 A | * | 2/1924 | Funk |
| 1,516,856 A | * | 11/1924 | Johnson ........................ 280/1.5 |
| 1,829,367 A | * | 10/1931 | Atkinson ....................... 16/112.1 |
| 1,829,467 A | * | 10/1931 | Atkinson ....................... 16/112.1 |
| 2,123,813 A | * | 7/1938 | Stiles |
| 2,235,042 A | * | 3/1941 | Ronning |
| 3,200,973 A | * | 8/1965 | Galbraith ....................... 414/717 |
| 3,401,951 A | * | 9/1968 | Bloom |
| 3,404,427 A | | 10/1968 | Mack ............................ 16/427 |
| 3,580,346 A | * | 5/1971 | McLaren ........................ 18/19.1 |
| 3,609,753 A | | 9/1971 | Albarda ......................... 341/155 |
| 3,820,807 A | * | 6/1974 | Curran .......................... 280/47.3 |
| 3,888,501 A | * | 6/1975 | McChesney ..................... 280/47.18 |
| 4,038,719 A | * | 8/1977 | Bennett ......................... 16/430 |
| 4,128,252 A | | 12/1978 | Raniero ......................... 280/40 |
| 4,261,590 A | | 4/1981 | Schupbach ...................... 280/47.31 |
| 4,270,786 A | | 6/1981 | Mattox .......................... 298/3 |
| 4,471,996 A | | 9/1984 | Primeau ......................... 298/3 |
| 4,683,610 A | | 8/1987 | Richards et al. ................. 16/429 |
| 4,758,010 A | | 7/1988 | Christie ........................ 280/47.31 |
| 4,951,956 A | | 8/1990 | Vittone ......................... 280/47.31 |
| 5,149,116 A | | 9/1992 | Donze et al. .................... 280/47.26 |
| 5,153,966 A | | 10/1992 | Godwin .......................... 16/421 |
| D357,099 S | | 4/1995 | Sammons, Jr. .................... D34/27 |
| 5,601,298 A | | 2/1997 | Watanabe ........................ 280/47.31 |
| D393,514 S | | 4/1998 | Hadley et al. ................... D34/27 |
| 5,810,375 A | * | 9/1998 | Hoffarth et al. ................. 280/47.31 |
| 5,884,920 A | * | 3/1999 | Seto ............................ 280/1.5 |
| 6,065,189 A | * | 5/2000 | Trine ........................... 16/436 |

FOREIGN PATENT DOCUMENTS

GB          2148208 A      5/1985

* cited by examiner

*Primary Examiner*—Anthony Knight
(74) *Attorney, Agent, or Firm*—Fish & Richardson P.C.

(57) ABSTRACT

A handle attachment is appended to a straight wheelbarrow handle. A first portion of the attachment has a specially designed flared end which is fitted to securely engage a rectangular portion of the wheelbarrow handle. The first portion of the attachment is straight to enable a handle to accept the extending end of the wheelbarrow handle. The attachment has a second portion that is curved downward and away from the wheelbarrow handle to form semi-circular shape. A third portion of the attachment is a straight projection that terminates forming an end thereof.

15 Claims, 10 Drawing Sheets

CURVED HANDLE ADAPTED FOR ATTACHMENT TO A WHEELBARROW OR THE LIKE, AND A METHOD OF MANUFACTURING THE SAME

Background of the Invention

1. Field of the Invention

The present invention relates to a curved handle adapted for attachment to a wheelbarrow, and a method of manufacturing the same. The handle attachment enables a smooth, continuous repositioning of the hands of an operator during each phase of wheelbarrow operation. As such, the handle attachment provides for a safer, more efficient and less strenuous use of a wheelbarrow, particularly when operating a wheelbarrow with heavier loads on hillsides and during dumping.

2. Brief Description of Related Art

Figure 1:
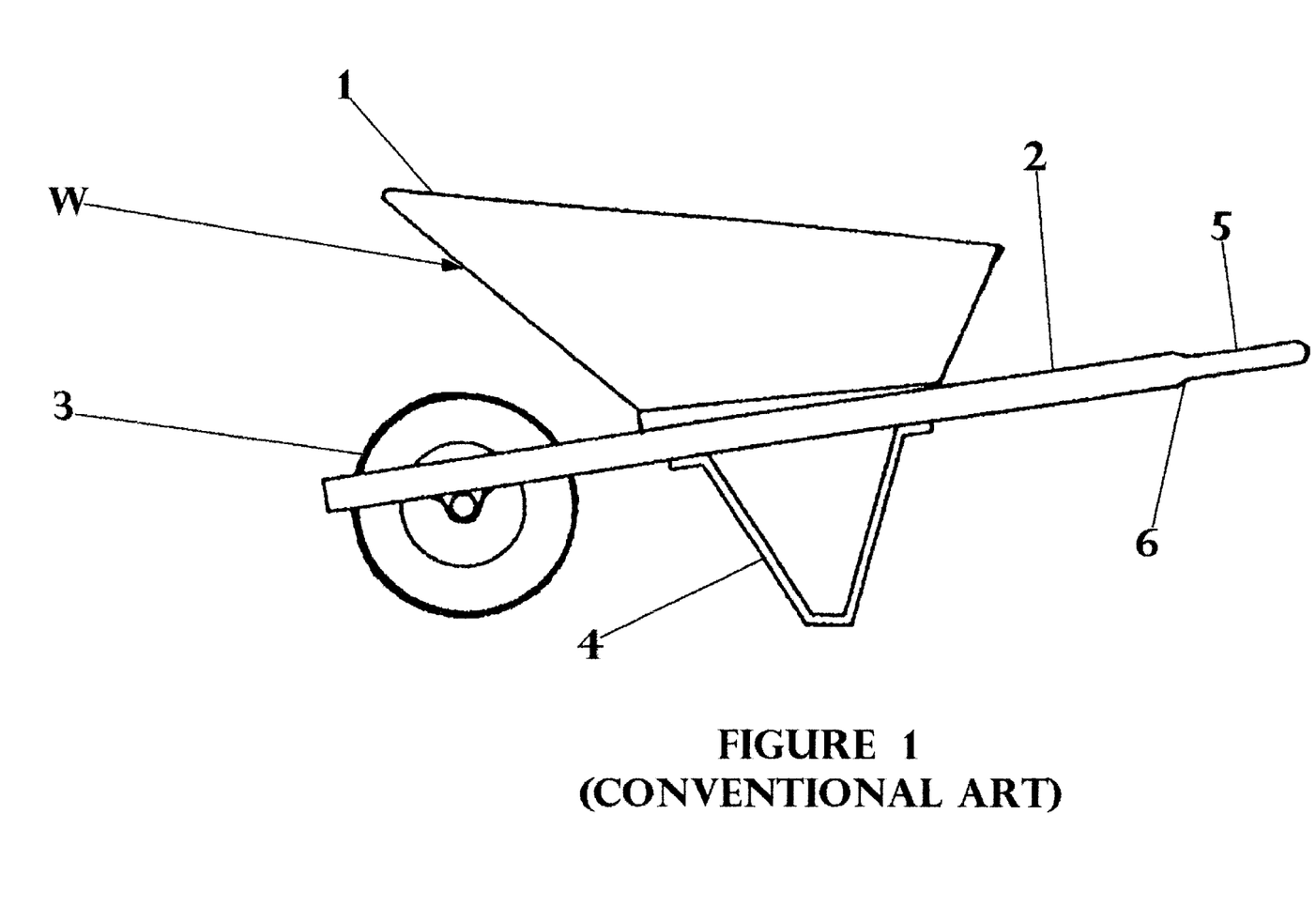
FIG. 1 is a side view of a conventional wheelbarrow with straight wooden handles.

As shown in FIG. 1, conventional wheelbarrows W include a tub 1, at least one front wheel 3, multiple legs 4, and a pair of wooden handles 2 extended to the rear of the wheelbarrow W. An operator holds the handles 2 from a position that is behind the wheelbarrow W. From that position, the operator grasps the rounded portion 5 of the handles 2 to lift and move the wheelbarrow W.

The stock of the handles 2 is generally straight, having a square/rectangular cross-section that changes into a circular cross-section at a transition area 6, the portion of the handle 2 having a circular cross-section being used for gripping of the wheelbarrow W by an operator. The straightness of the handle shaft 2 can render the wheelbarrow W unsafe and difficult to use, especially when ascending or descending a hillside or while dumping the contents of the wheelbarrow.

For instance, because of the straight handle design, an operator must quickly change from an above-the-handles grip to a below-the-handles grip to dump the contents of the wheelbarrow W. This requires an incredible amount of agility and dexterity, especially when heavier loads are carried by the wheelbarrow W. If the operator is not able to effectively change grips, the load may be damaged and the operator or those nearby may be injured due to tipping or loss of control of the wheelbarrow W. In addition, an undue amount of strain is experienced by the operator while changing grips as described. This strain may cause injury and weariness to the operator, which can lead to further injuries. Also, in order for an operator to fully dump the contents of a conventional wheelbarrow W, the operator must stand fairly close to the legs of the wheelbarrow, exposing their legs or shins to injury caused by contact with the legs of the wheelbarrow W, especially when twisting the wheelbarrow to empty the last of its contents.

In addition to the above-described dumping problems experienced by conventional wheelbarrows, safety and maneuverability are compromised when moving a conventional wheelbarrow on hillsides or backwards. In either case, the straight design of the wooden handles 2 causes the wrists of an operator to be bent at an awkward and strenuous angle while ascending or descending an inclined hillside and while moving the wheelbarrow backwards.

Furthermore, when holding or moving a conventional wheelbarrow on a declined hillside, gravity naturally causes the wheelbarrow to pull away from the operator. To prevent separation between the operator and the wheelbarrow in this situation, the operator must grip the handle tighter, increasing forearm and hand fatigue and causing the angle of wrist inclination to increase to an undesirable angle. Consequently, while holding or moving a conventional wheelbarrow on declined slopes, the natural tendency of the operator is to crouch, rendering the operator susceptible to lower back and leg strain. These problems are extenuated by heavier loads because the strain experienced by the wrist, forearms, legs and back is increased with weight, making the operator more likely to lose their grip of the handles or lose control of the wheelbarrow. Wet hands also extenuate the above-described problems since the grip of an operator is less easily maintained with wet hands or gloves.

To improve upon conventional wheelbarrow designs, the wheelbarrows of FIGS. 2A–3B have been proposed. However, as discussed hereinafter, each is susceptible to many of the problems experienced by the conventional wheelbarrow as in FIG. 1, as well as some new problems not experienced by the conventional wheelbarrow of FIG. 1.

Figure 2A:
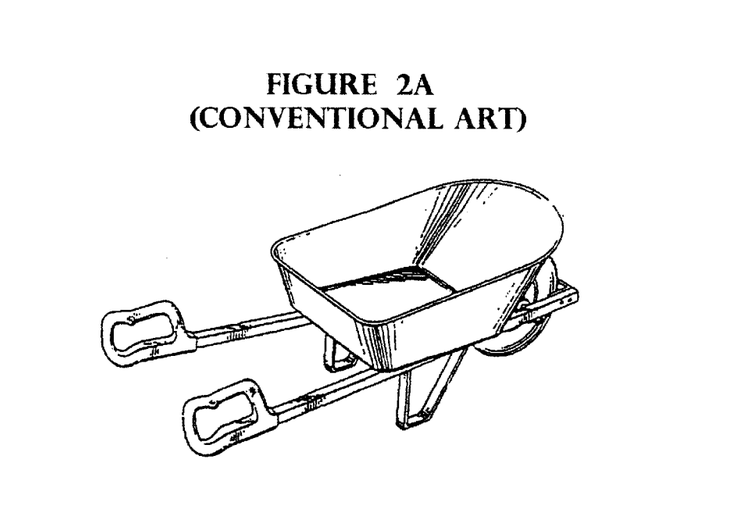
FIGS. 2A–2B illustrate conventional wheelbarrows having handle attachments that curve in the upward direction, away from the ground.
Figure 2B:
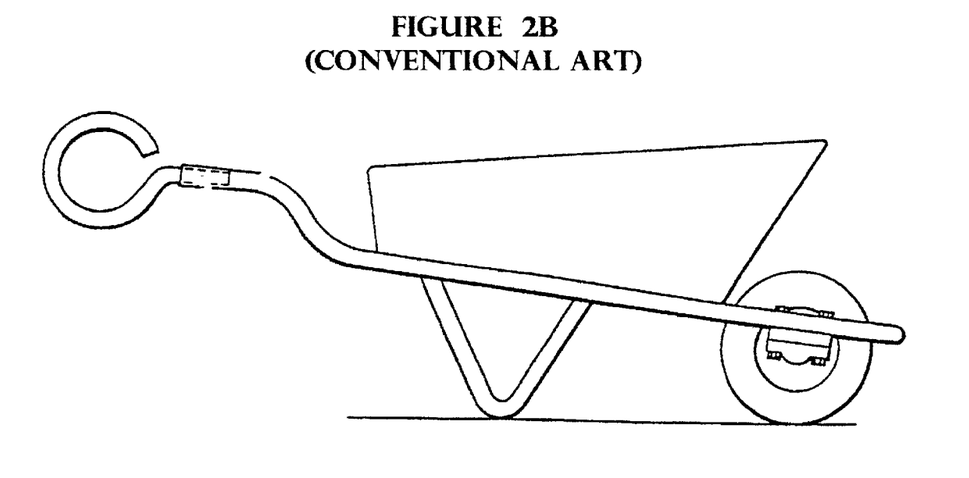

FIG. 2A shows a conventional wheelbarrow having a handle forming a rectangular loop that extends in an upward direction, away from the ground. Similarly, FIG. 2B shows a wheelbarrow having a handle forming a loop that extends in an upward direction, away from the ground. As such, the handles shown in FIGS. 2A and 2B have curved portions that extend above the longitudinal axis of the straight handle of the wheelbarrow. Handles that are curved in this direction reduce the ability of an operator to provide normal clearance of the wheelbarrow legs over any surface above which the wheelbarrow is operated, regardless whether the surface is level, downhill or uphill. For instance, when a handle has a curved portion that extends above the longitudinal axis of the straight portion of the wheelbarrow stock, the operator is required to lift the wheelbarrow an additional height equal to the distance between the grip position along the curved portion and the longitudinal axis of the straight portion of the handle. Otherwise, the leg-to-surface clearance of the wheelbarrow is diminished. By lifting the wheelbarrow the additional height, the physical stresses experienced by the operator are increased.

Figure 3A:
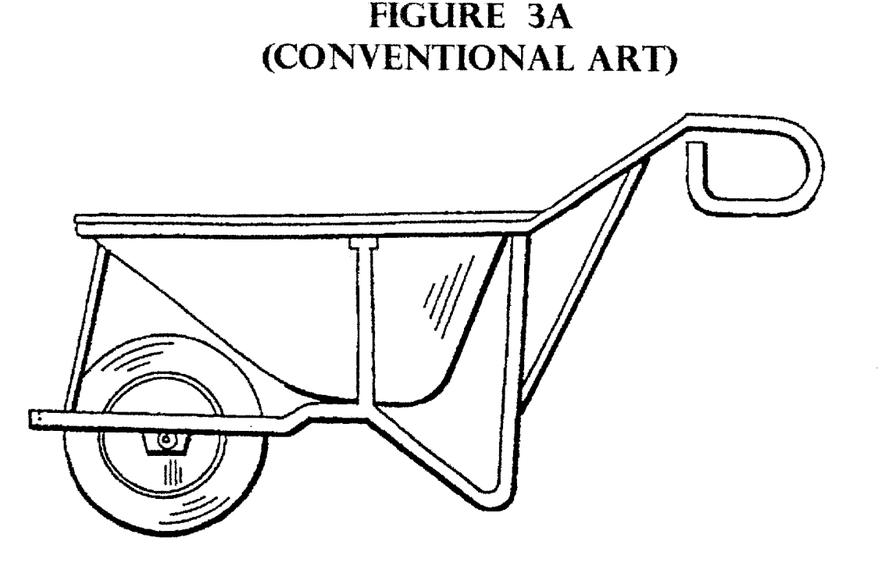
FIGS. 3A–3B illustrate conventional wheelbarrows having unitary handles curved in a downward direction, towards the ground.
Figure 3B:
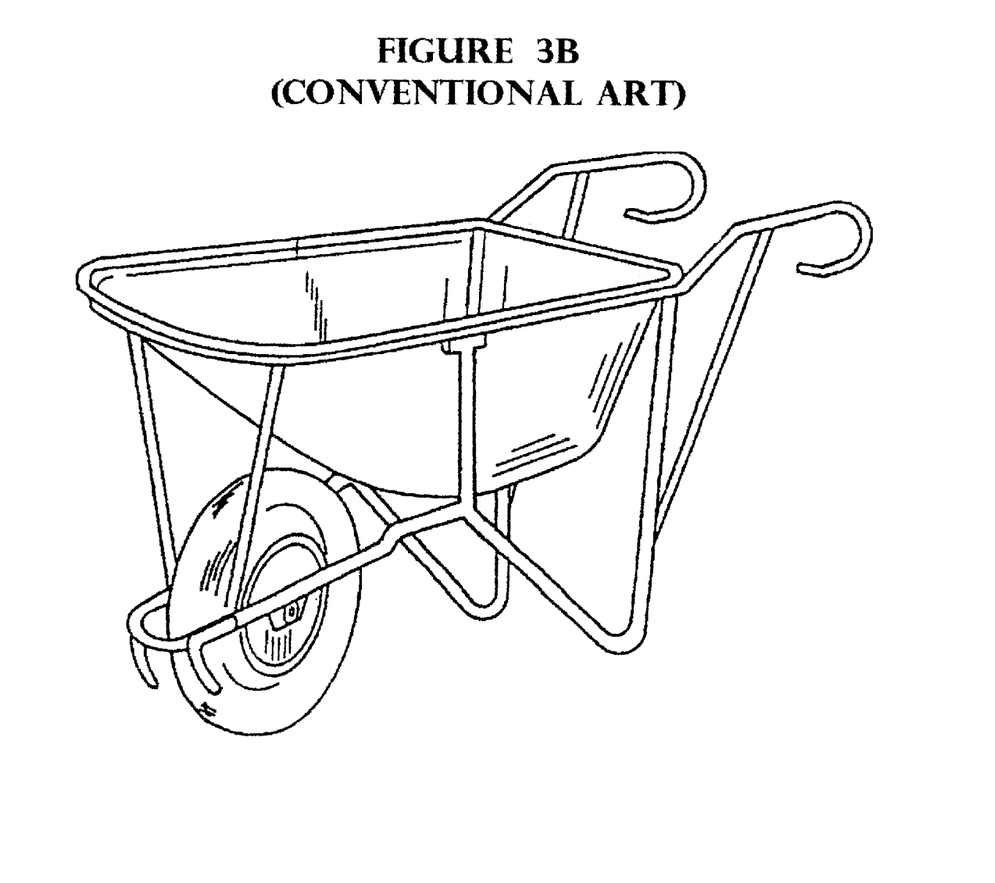

FIGS. 3A and 3B show wheelbarrows having handles forming curved portions that extend in the downward direction, toward the ground. However, each of the wheelbarrows shown in FIGS. 3A and 3B are subject to the same clearance problems as the wheelbarrow assemblies as shown in 2A and 2B, rendering the operator susceptible to the same physical stresses. Specifically, the stock of the wheelbarrows shown in FIGS. 3A and 3B is bent in an upward direction to offset the handle region in a position above the longitudinal axis of the straight portion of the wheelbarrow stock. As such, the operator is required to lift the wheelbarrow an additional height to clear objects in its path. Thus, an operator of the wheelbarrow assemblies shown in FIGS. 3A and 3B is subject to the same increases in physical stresses experienced by an operator of the wheelbarrow assemblies shown in FIGS. 2A and 2B.

Furthermore, each of the handles shown in 2A–3B form a loop that is substantially or completely closed, making an operator susceptible to discomfort and injury. Specifically, loops that are closed more than 180° like those shown in FIGS. 2A–3B, are more difficult to release in emergency situations to prevent injury. In fact, a handle having a closed loop, such as those shown in FIGS. 2A–3A, renders the arm or hand of an operator susceptible to injury since the hand or arm may become lodged inside such a closed loop, particularly if the wheelbarrow moves out of control. In addition, such a closed loop design may cause the fingers to be pinched.

While the wheelbarrows shown in FIGS. 3A–3B have handles forming curved end portions, it is also important to note that each of these curved portions are integrated into the single structure that constitutes the handle stock. As such, the length of the handle stock is permanently increased and additional storage space is required for the wheelbarrow. In addition, because the curved portion is integrated as a part of the handle, damage to the curved portion renders the wheelbarrow unusable. Also, because the assemblies shown in FIGS. 3A and 3B include a unitary handle design, implementation of those handles requires replacement of conventional wheelbarrows rather than retrofit. As such, energy and raw materials are wasted.

In addition, any decrease in cross-sectional diameter of the straight, weight-bearing portion of the wheelbarrow stock or handle relative to the cross-sectional diameter of an ordinary conventional wheelbarrow may result in the application of additional pressure on the hands of a wheelbarrow operator, leading to pain and fatigue. For instance, the stock and handle of the wheelbarrow shown in FIGS. 3A–3B appears to have a cross-sectional diameter that is smaller than the cross-sectional diameter of an ordinary conventional wheelbarrow. As such, an operator of the wheelbarrow shown in FIGS. 3A–3B may experience pain or fatigue due to the application of increased hand pressure during wheelbarrow operation.

SUMMARY OF THE INVENTION

The present invention is directed to a system that substantially obviates one or more of the problems experienced due to the above and other limitations and disadvantages of the related art.

It is an object of the present invention to provide an operator with a continuous smooth grip during all phases of operation, especially during dumping. This greatly reduces the possibility of an accident or spilled load.

Another object of the present invention is to reduce strain and fatigue on the wrists, forearms, legs and back of the operator.

Also, another object of the present invention is to enable the operator's wrists to stay straight while maneuvering on slopes, thereby reducing strain.

Yet another object of the present invention is to allow the operator to use the wheelbarrow as if it were a conventional wheelbarrow handle, except while dumping.

Another object of the present invention is to provide the operator with the safest possible control of the wheelbarrow in each phase of operation and over varied terrain.

A further object of the present invention is to extend the distance between the operator's legs and the wheelbarrow's legs to reduce possible injury.

Another object of the present invention is to provide a handle attachment that is as strong or stronger than the conventional handle.

Yet another object of the present invention is to provide a handle attachment that will stay in the same vertical line of the conventional handle, thereby reducing risk of injury to the operator.

A further object of the present invention is to provide an open loop handle attachment, which decreases the possibility of limb or hand entrapment or injury.

Another object of the present invention is to utilize a downward curve to provide the safest, most efficient use of the wheelbarrow.

Yet another object of the present invention is to provide a handle attachment that engages the square/rectangular cross-sectional portion of the conventional wooden wheelbarrow handle whereby increasing safety and reducing rotational stress about the longitudinal axis.

Still a further object of the present invention is to provide an enclosed rearward end of the attachment whereby reducing the risk of accidental insertion of the operator's fingers.

Another object of the present invention is to begin the downward bend as near as possible to the conventional handle, which minimizes grasp height while dumping.

A further object of the present invention is to provide a handle attachment that is easily manufactured, and that can be transferred between multiple wheelbarrows.

Yet another object of the present invention is to provide a handle attachment that is easily installed and secured to a standard conventional wheelbarrow handle.

A further object of the present invention is to provide a handle attachment that is reusable.

An additional object of the present invention is to provide a handle attachment having a straight weight-bearing handle portion with a cross-sectional diameter at least as wide as the cross-sectional diameter of a handle portion of a conventional wheelbarrow to which it is attached.

These and other objects of the present invention are accomplished by a curved handle attachment that allows the entire grasping area of the conventional handle to be inserted. It will be in the same vertical line of a standard conventional handle. The forward portion is specially flared to snugly fit the square/rectangle portion of the conventional handle. It is secured with a safety screw or other fastening method. The rearward portion is bent down and somewhat forward to form a semicircle.

Other and further objects, features and advantages of the present invention will be set forth in the description that follows, and in part will become apparent from the detailed description, or may be learned by practice of the invention.

To achieve these and other advantages and in accordance with the purpose of the present invention, as embodied and broadly described, the present invention includes a curved handle attachment for retrofitting a wheelbarrow handle stock which has an engaging section for securing a curved handle attachment to the wheelbarrow handle stock, a curved section extending in a downward direction and being positioned below a longitudinal axis of the wheelbarrow stock, and a fastening device that is passed through a flared end of the engaging section to engage the wheelbarrow stock. The curved section of the attachment is positioned below a plain defined by an upper surface of the wheelbarrow bucket, the curved section having a degree of curvature of less than 180, preferably 165. The flared end of the engaging section engages a portion of the wheelbarrow handle stock having a rectangular cross-section, the flared end preventing rotational movement of the curved handle attachment relative to the wheelbarrow stock. The curved handle attachment may also include a straight end section extending from the curved section in a downward direction. The cross-sectional diameter of the engaging section and straight end section is greater than a cross-sectional diameter of the curved portion.

Additionally, to achieve these and other advantages, the present invention may include a method of manufacturing a curved handle attachment that includes bending an interior portion of a hollow pipe to achieve a curvature of less than 180, expanding one end of the hollow pipe using a mandrel, changing a cross-sectional diameter of the curved portion of the hollow tube by forming a rectangular cross-sectional shaped end that is capable of engaging a rectangular cross-sectional portion of a wheelbarrow handle stock, drilling a hole in a flat portion of the rectangular cross-sectional shaped end of the hollow tube, suspending the curved handle attachment using the hole drilled in the rectangular cross-sectional shaped end of the hollow tube, painting the curved handle attachment while suspended, and inserting a lag-type fastening device through the hole to engage the wheelbarrow handle stock.

It is to be understood that both the foregoing general description and the following detailed description are exemplary and explanatory and are intended to provide further explanation of the invention as claimed. Thus, it should be understood that the detailed description and specific examples, while indicating preferred embodiments of the invention, are given by way of example only. Various changes and modifications that are within the spirit and scope of the invention will become apparent to those skilled in the art from this detailed description. In fact, other objects, features and characteristics of the present invention; methods, operation, and functions of the related elements of the structure; combinations of parts; and economies of manufacture will surely become apparent from the following detailed description of the preferred embodiments and accompanying drawings, all of which form a part of this specification, wherein like reference numerals designate corresponding parts in various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF A PREFERRED EMBODIMENT OF THE PRESENT INVENTION

Reference will now be made in detail to the preferred embodiments of the present invention, examples of which are illustrated in the accompanying drawings. In the drawings, redundant description of like elements and processes, which are designated with like reference numerals, is omitted for brevity.

Figure 4:
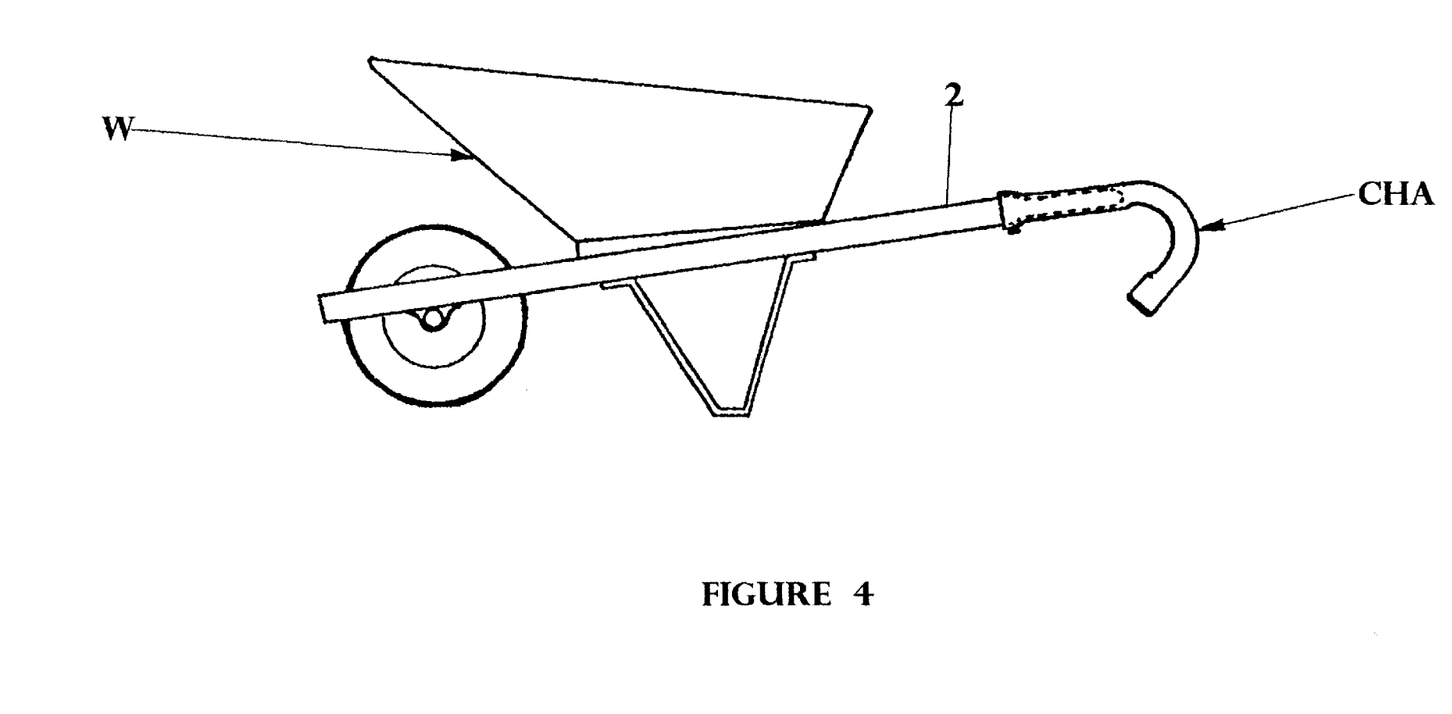
FIG. 4 is a side view of a curved handle attachment according to a first embodiment of the present invention, the curved handle attachment being attached to a wheelbarrow having straight wooden handles.

FIG. 4 illustrates a curved handle attachment CHA that is attached to a single wooden stock 2 of a wheelbarrow W. As illustrated by FIG. 4, the curved handle attachment CHA may be retrofit to existing conventional wheelbarrows. As such, the conventional handle attachment does not render conventional wheelbarrows obsolete. Rather, the curved handle attachment CHA may be installed or removed without damaging a conventional wheelbarrow. Therefore, the storage space required for conventional wheelbarrows is not necessarily increased through retrofit with the curved handle attachment CHA, and wheelbarrow functionality is not inhibited by damage to the curved handle attachment CHA. Furthermore, as will be described hereinafter, the curved handle attachment CHA includes a flared-end flange and a fastening device (e.g., pin/bolt/screw) that are used to secure the curved handle attachment CHA to the stock 2 of a conventional wheelbarrow rotationally and translationally.

Figure 5:
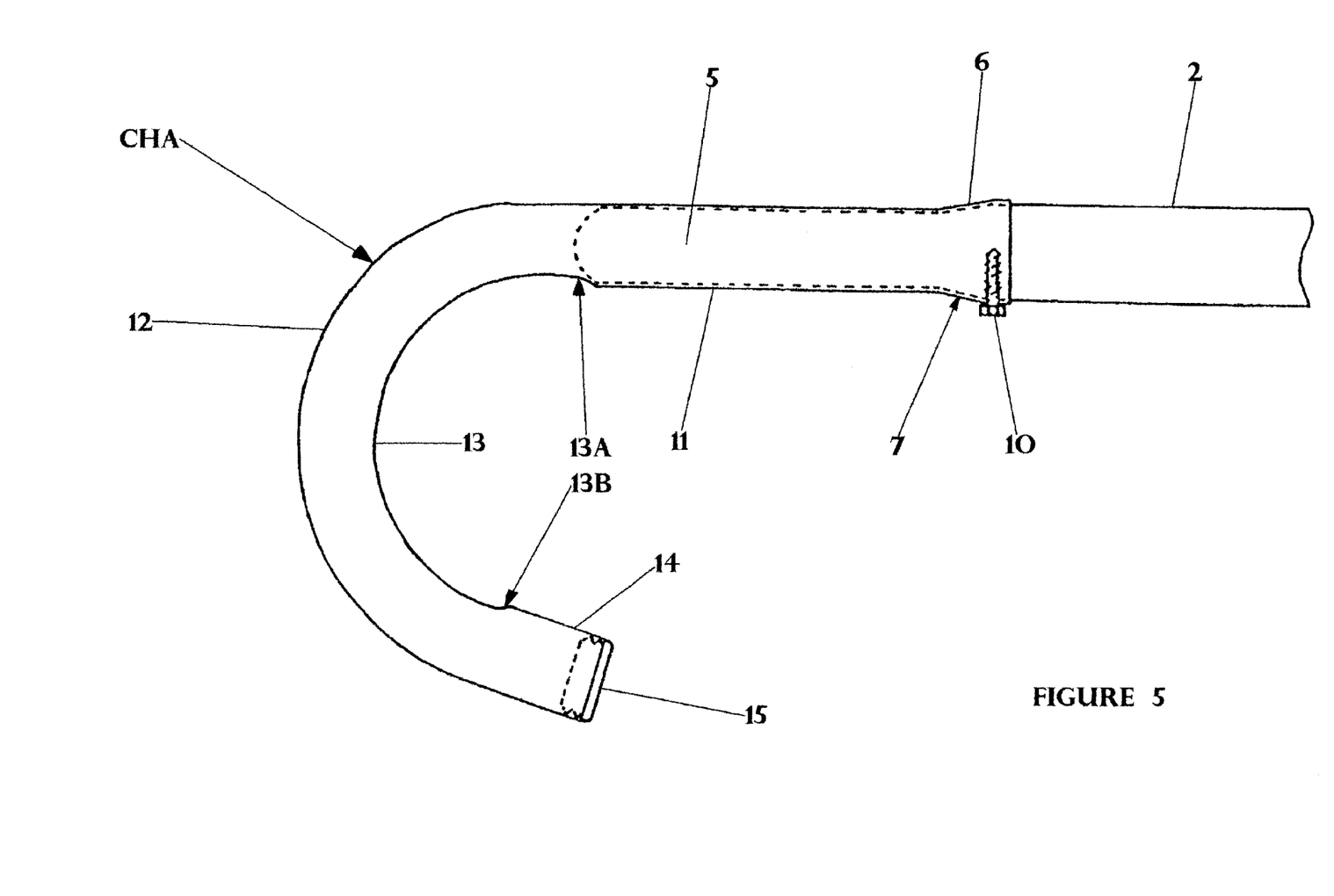
FIG. 5 is a sectional right-hand elevation view of the curved handle attachment shown in FIG. 4.

FIG. 5 is a sectional right-hand elevation view of the curved handle attachment CHA shown in FIG. 4. As illustrated by this view, the curved handle attachment CHA is inserted over the straight unitary handle stock of a wheelbarrow in a glove-like fashion.

Figure 6:
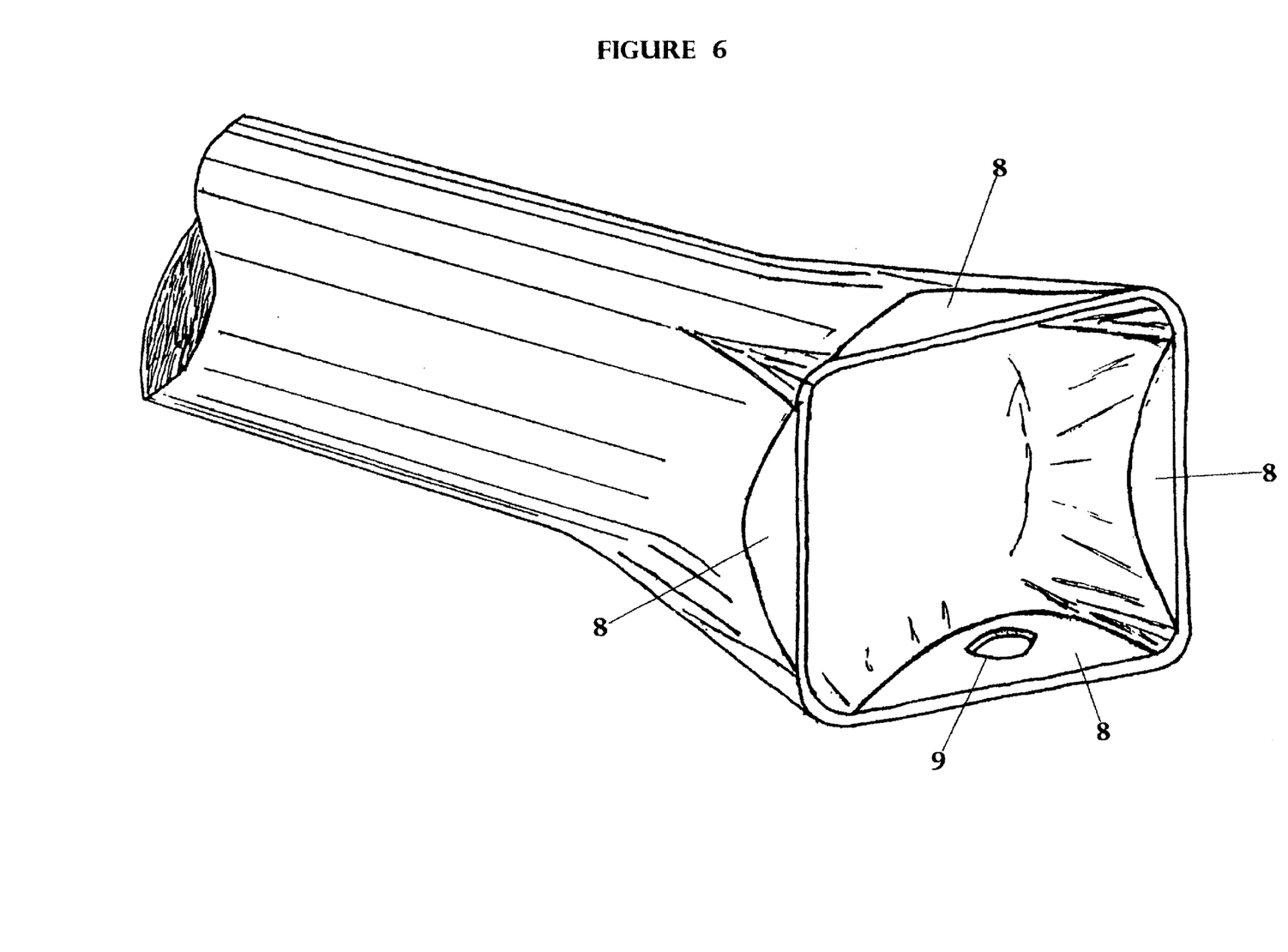
FIG. 6 is a perspective view of an end of the curved handle attachment that engages the stock of a wheelbarrow.

The transitional area 6 represents the area in which both the wheelbarrow stock 2 and the curved handle attachment CHA transition from a rectangular/square cross-section to a circular cross-section. A flared end 7 of the curved handle attachment CHA consists of four flat sides 8 (see FIG. 6) for engaging the flats of the prior art wooden wheelbarrow stock 2. As such, the end of the curved handle attachment CHA has an increased cross-sectional area, preventing accidental movement of an operator's hands up the handle. The flared end 7 incorporates a hole 9 in the bottom flat 8 to allow passage of a lag-type fastening device 10, e.g., a screw, pin or bolt, for securing the curved handle attachment CHA to the wheelbarrow stock 2. However, the hole may be positioned in a side or top flat or along a straight portion 11 of the curved handle attachment CHA, if desired.

The straight portion 11 extends from the flared end 7 to a curved area 12, the length of the straight portion 11 being at least as great as the circular cross-sectioned grip area 5 of the wheelbarrow stock 2, and generally slightly greater. Immediately to the rear of the straight portion 11, a curved area 12 extends vertically downward from the longitudinal axis of the wheelbarrow stock 2 that engages the bucket of the wheelbarrow. The curved portion has a degree of curvature that does not exceed 180° from the longitudinal axis of the wheelbarrow stock 2 to prevent injury to the operator, and preferably is 165° from that axis. Within the inside radius of the curved portion 12, the cross-sectional diameter of the curved handle attachment CHA is reduced, resulting in a recessed grip area 13 which begins at the area identified by reference numeral 13*a* and extends around to the area identified by reference numeral 13*b*.

At the bottom of the portion of the recessed grip area identified as 13*b*, the curved handle attachment CHA returns to the original cross-sectional diameter, which is characteristic of straight portion 11. The curved handle attachment CHA has a linear segment portion 14 that extends forward, toward the wheelbarrow, from the end of curved portion 12. The linear segment portion 14 located at the end of the curved handle attachment CHA has an increased cross-section for preventing accidental release of an operator's hands during operation. The end of the curved handle attachment CHA is closed by a plug or a cap 15.

Figure 7:
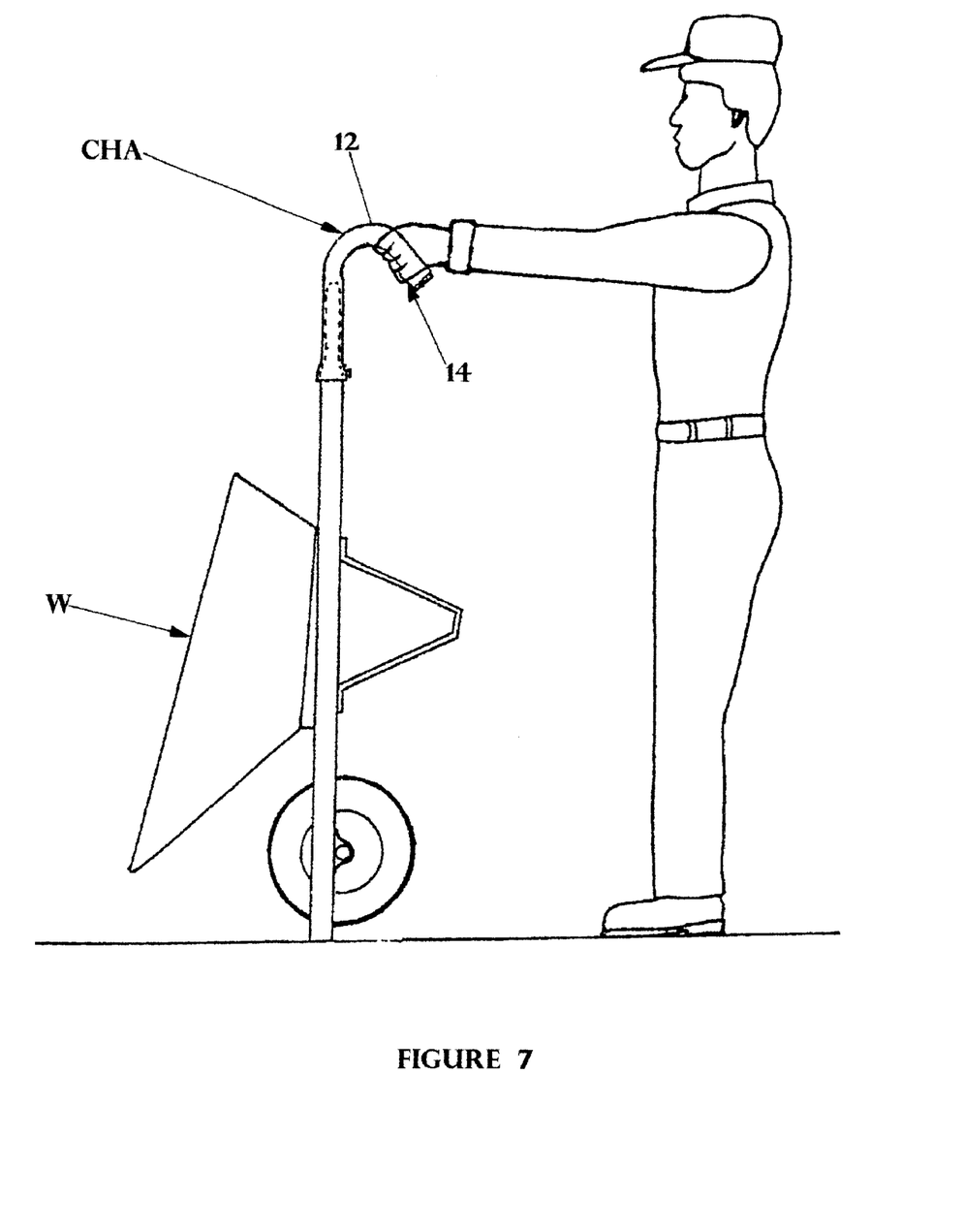
FIG. 7 is a side view of the curved handle attachment that is attached to a wheelbarrow being fully dumped.
Figure 8:
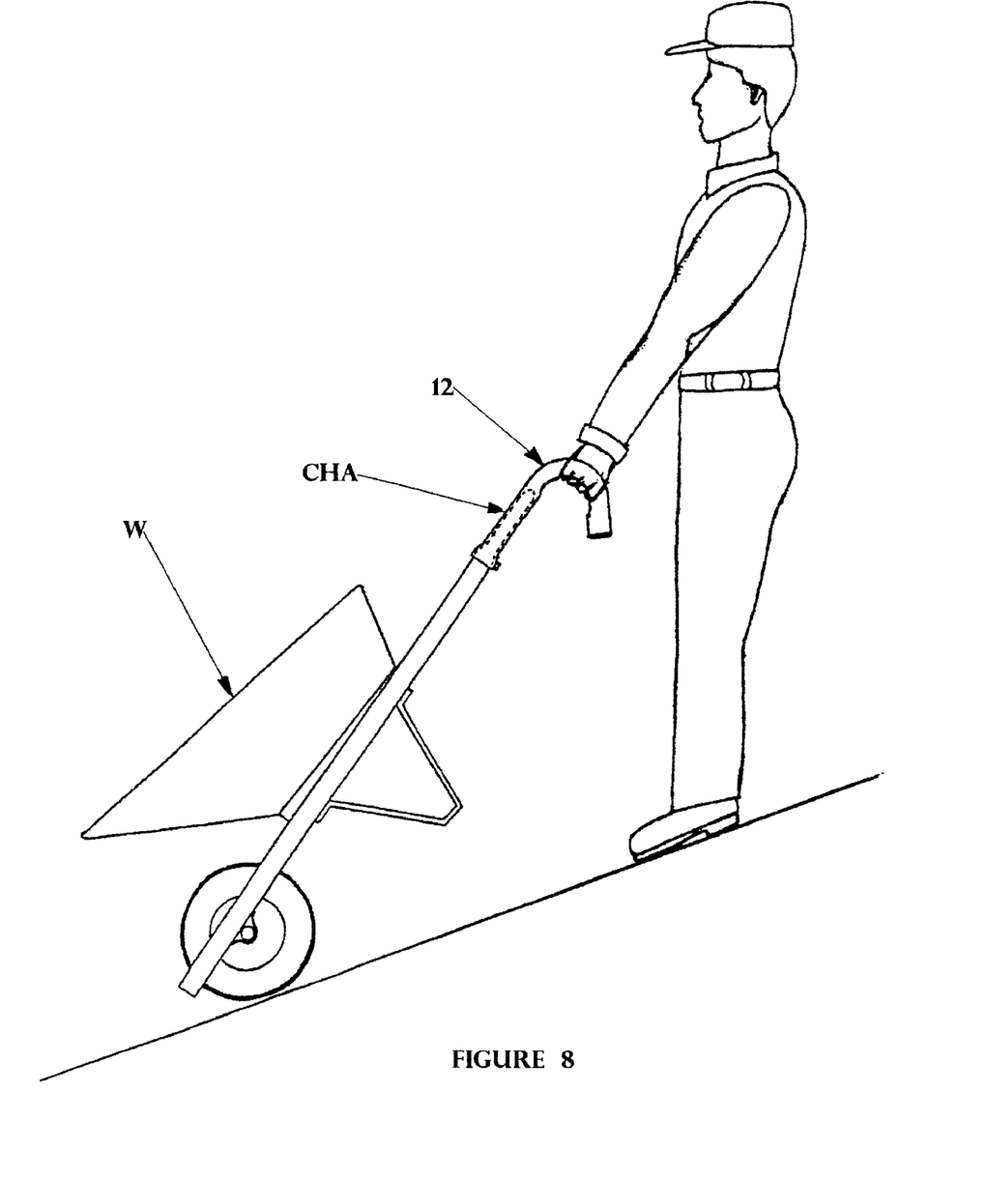
FIG. 8 is a side view of the curved handle attachment that is attached to a wheelbarrow located on a downhill grade.

During ordinary use of a wheelbarrow W retrofitted with the curved handle attachment CHA, the operator grasps the straight portion 11 of the curved handle attachment CHA which has a grip that is similar to the wheelbarrow handle grip area 5. However, as seen in FIG. 7, when dumping contents of the wheelbarrow W, hands of an operator may slide continuously and smoothly around the curved portion 12 to the linear portion 14 of the curved handle attachment CHA. Similarly, to counteract gravity while on a declined surface, the hands of an operator may be positioned along curved portion 12, as shown in FIG. 8. In either case, the curved handle attachment CHA allows for a smooth, continuous repositioning of the operator's hands along the curved portion 12 to a comfortable and controllable position. This natural repositioning of the grip allows for the reduction of stresses on the hands, wrists, forearms, shoulders, back and legs.

The material used to fabricate the curved handle attachment is generally metal, e.g., the metal conventionally used for standard tubing. However, the curved handle attachment CHA can be made of any material that provides similar shape and strength as the invention described herein.

Figure 9:
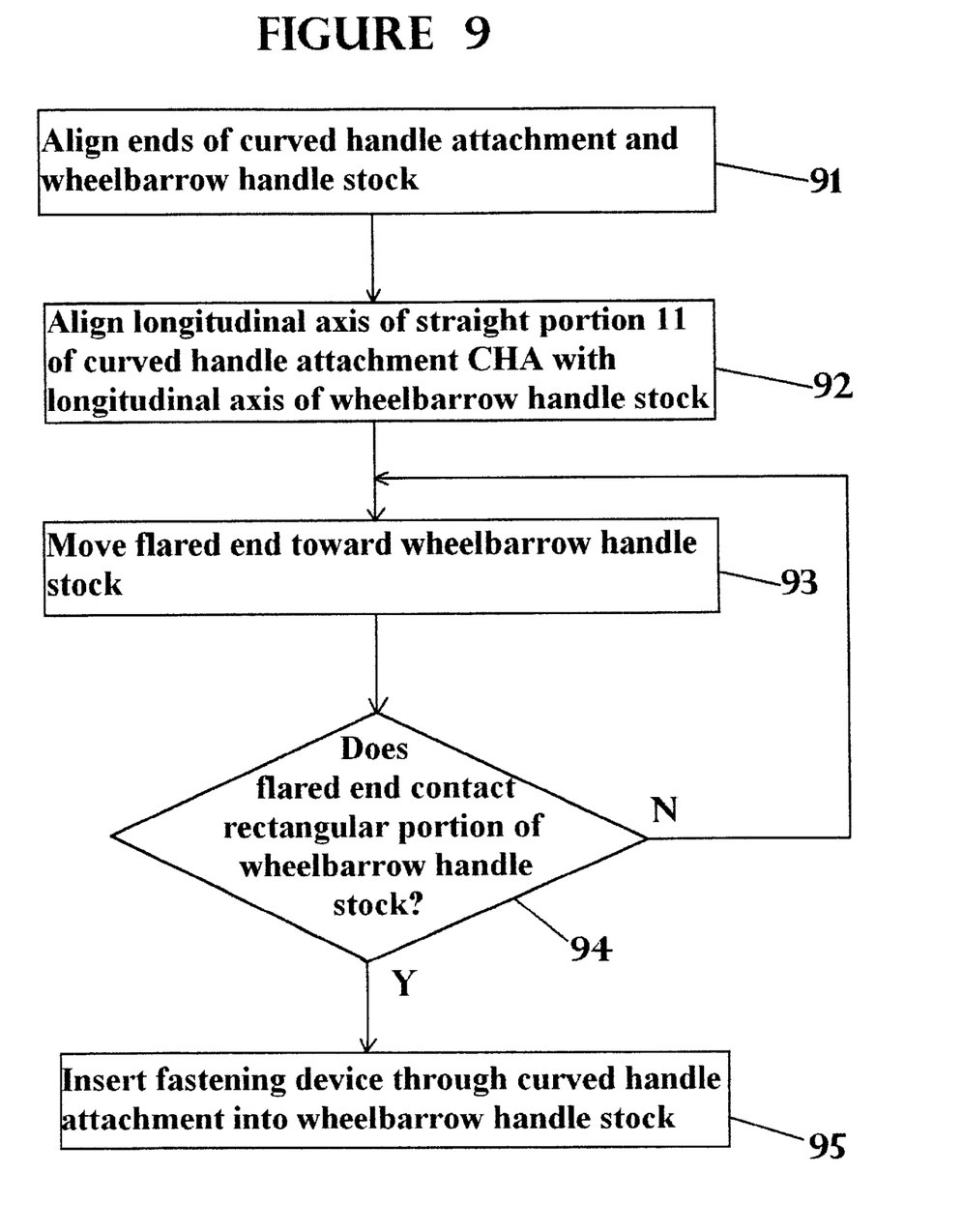
FIG. 9 is a flow chart describing the process used to engage the curved handle attachment CHA with a conventional wheelbarrow handle.

With reference to FIG. 5, the flow chart of FIG. 9 describes the process used to engage the curved handle attachment CHA with a conventional wheelbarrow handle. In step 91, the flared end 7 of the curved handle attachment CHA is aligned with the end of the wheelbarrow handle stock 2. Then, in step 92, the longitudinal axis of straight portion 11 of the curved handle attachment CHA is aligned with the longitudinal axis of wheelbarrow handle stock 2. The flared end 7 of curved handle attachment CHA is moved toward wheelbarrow handle stock 2 in step 93. If the flared end 7 does not contact a rectangular cross-section portion of the wheelbarrow handle stock 2, in step 94, step 93 is again performed to move the flared end 7 of the curved handle attachment CHA toward wheelbarrow handle stock 2. However, if the flared end 7 of the curved handle attachment CHA contacts a portion of the wheelbarrow handle stock 2 having a rectangular cross-section, fastening device 10 is inserted through the curved handle attachment CHA into wheelbarrow handle stock 2 in step 95.

Figure 10:
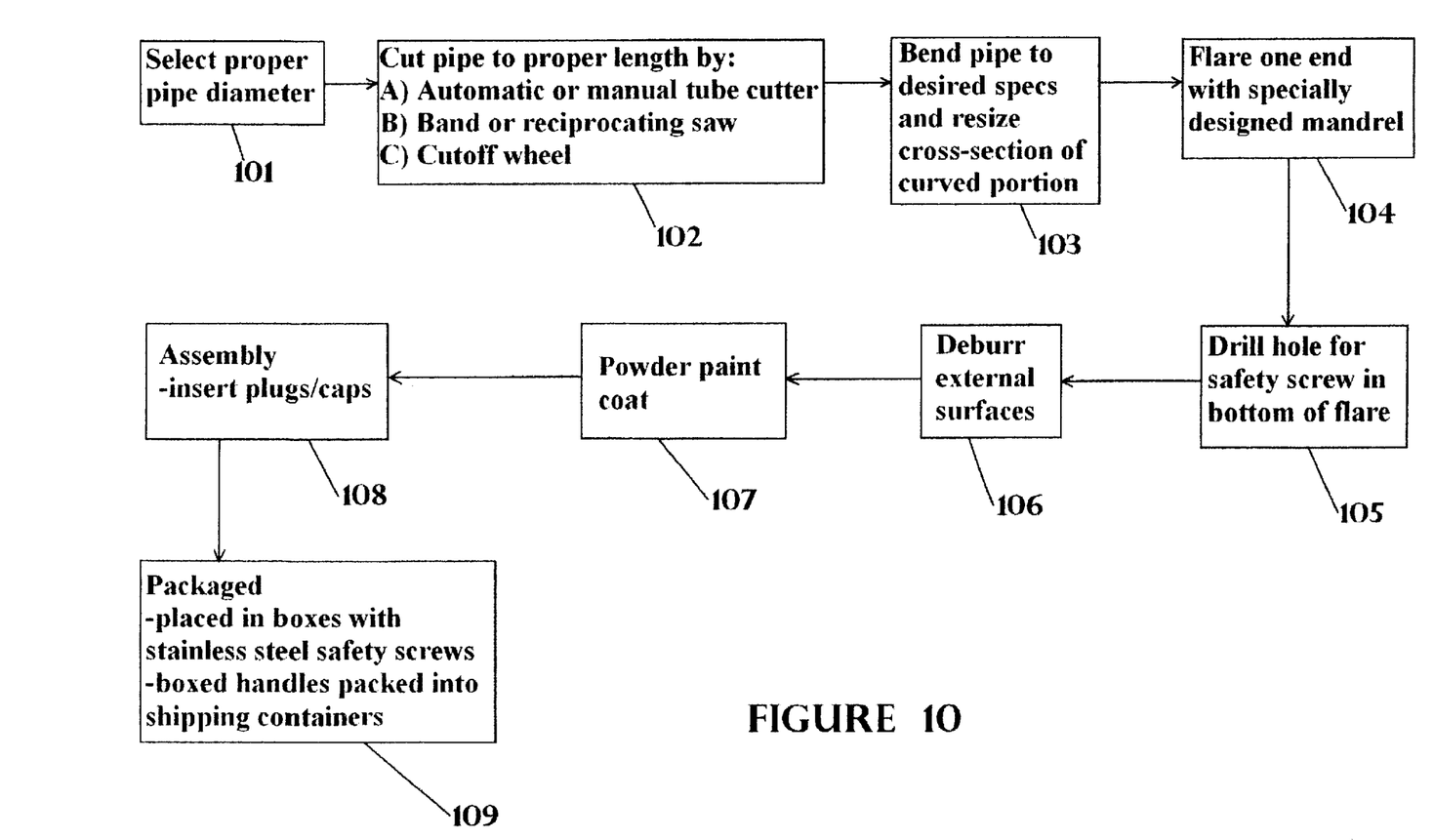
FIG. 10 is a flow chart describing the process used to manufacture the curved handle attachment CHA of the present invention.

FIG. 10 is a flow chart describing the process used to manufacture the above-described curved handle attachment CHA. In step 101, a pipe diameter is selected based on the diameter of the wheelbarrow handle stock to be retrofit and the size of the desired grip. The pipe is cut to a desired length in step 102 using conventional means such as an automatic or manual tube cutter, a band or reciprocating saw or a cutoff wheel. The pipe is then bent to a desired curvature and the cross-section of the curved portion is resized in step 103. During step 103, the diameter of the curved portion is reduced relative to the straight portions. In step 103, the tubing is bent using a Ben Pearson Bend Master having 3" radius die. Thus, conventional molding and welding processes are not necessary. In step 104, one end of the bent pipe is then flared using a specially designed mandrel to achieve the shape shown in FIG. 6. A hole is drilled in the bottom of the flared end, and all external surfaces are deburred in steps 105 and 106, respectively. The newly drilled hole is then used to hang the curved handle attachment CHA on a conveyor hook, which transports the curved handle attachment CHA through heating and spraying booths where it is painted. In steps 108 and 109, plugs are inserted in the ends of the curved handle attachment CHA and the curved handle attachment CHA is packaged for shipping.

Using a tube bender having 3" radius die, the grains of steel in the tubing may be aligned longitudinally with the length of the tube segment, resulting in greater strength in the vertical and horizontal force directions. This process avoids the disadvantages inherent in plastic molding and rod under-bending. Specifically, molded handles provide no alignment of grain structures, resulting in a non-homogeneous grain pattern that is susceptible to fatigue-induced wear spots when various forces are applied. Rod under-bending creates tiny stress fractures along the outside surface of the bent parameter rendering the surface susceptible to gradual or catastrophic failure when under shear force. Furthermore, the diameter of a rod is generally smaller than a tube, resulting in a weaker structure. Still further, the end of a rod may not be flared to fit existing wheelbarrow handle stock.

Advantages resulting from the use of the above-described method of manufacture include cost savings resulting from the use of steel tubing which is less expensive than forming molds, retrofitability of the curved handle attachment CHA, speedy manufacturing since the tube is bent and flared in a two-step process, colorfast designs are achievable since paint is less likely to fade than plastic, a lightweight design, and a one-man manufacturing process involving no welding. In addition, the use of a 3" radius die in the bending process of step 103 enables a recessed grip area and a flared end for avoiding accidental loss of grip, a divergent linear end segment, and a degree of curvature of less than 180°. The method of flaring the mandrel end of the tubing in step 104 incorporates a unique flare design to fit on conventional wheelbarrow handle stock. The linear end segment is neither recessed nor deformed during the bending process, thus enabling it to accept a round end plug.

While there have been illustrated and described what are at present considered to be preferred embodiments of the present invention, it will be understood by those skilled in the art that various changes and modifications may be made, and equivalents may be substituted for elements thereof without departing from the true scope of the present invention. For instance, although the handle is generally adapted for use with a wooden wheelbarrow handle stock, it may also be adapted for use with a wheelbarrow handle stock made of metal, plastic, or some other material or combination thereof.

In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What is claimed is:

1. A curved handle attachment for retrofitting a wheelbarrow handle stock, the attachment comprising:

an engaging section for securing the curved handle attachment to the wheelbarrow handle stock; and a curved section extending in a direction of and being positioned below a longitudinal axis of the wheelbarrow handle stock, wherein the curved section proceeds in one direction of curvature to a degree of curvature of greater than 90 but less than 180 degrees.

2. The attachment recited by claim 1, wherein the engaging section includes a flared end that engages a portion of the wheelbarrow handle stock having a rectangular cross-section, the flared end preventing rotational movement of the curved handle attachment relative to the wheelbarrow handle stock.

3. The attachment recited by claim 2, further comprising:

a fastening device that is passed through the flared end of the engaging section to engage the wheelbarrow handle stock.

4. The attachment recited by claim 1, further comprising:

a fastening device that is passed through the engaging section to engage the wheelbarrow handle stock.

5. The attachment recited by claim 1, further comprising:

a straight end section extending from the curved section in a downward direction.

6. The attachment recited by claim 1, wherein a cross-sectional diameter of the curved section is smaller than a cross-sectional diameter of the engaging section or a straight end section.

7. The attachment recited by claim 1, wherein the curvature of the curved section begins on the longitudinal axis of the wheelbarrow handle stock.

8. The attachment recited by claim 1, wherein the degree of curvature of less than 180 degrees exists along the entire curved section.

9. The attachment recited by claim 1, wherein the curvature is continuous.

10. The attachment of claim 1, wherein the curved section is positioned below a plane defined by an upper surface of a wheelbarrow bucket.

11. A method for manufacturing a curved handle attachment for retrofitting a wheelbarrow handle stock, comprising:

bending an interior portion of a hollow pipe to achieve a curved section structured and arranged to extend in a direction and to be positioned below a longitudinal area of the wheelbarrow handle stock where the curved section proceeds in one direction of curvature to a degree of curvature of greater than 90° but less than 180°; and expanding at least one end of the hollow pipe using a mandrel.

12. The method recited by claim 11, further comprising:

changing a cross-sectional diameter of the curved portion of the hollow tube.

13. The method recited by claim 12, wherein changing the cross-sectional diameter includes forming a rectangular cross-sectional shaped end that is capable of engaging a rectangular cross-section portion of a wheelbarrow handle stock.

14. The method recited by claim 13, further comprising:

drilling a hole in a flat portion of the rectangular cross-sectional shaped end of the hollow tube; and inserting a lag-type fastening device through the hole to engage the wheelbarrow handle stock.

15. The method recited by claim 14, further comprising:

suspending the curved handle attachment using the hole drilled in the rectangular cross-sectional shaped end; and painting the curved handle attachment while suspended.

* * * * *